Dec. 7, 1954
F. L. O. ROEHRIG
2,696,152
PLURAL FILM CAMERA WITH SLIDING LENS UNIT
Filed March 7, 1951
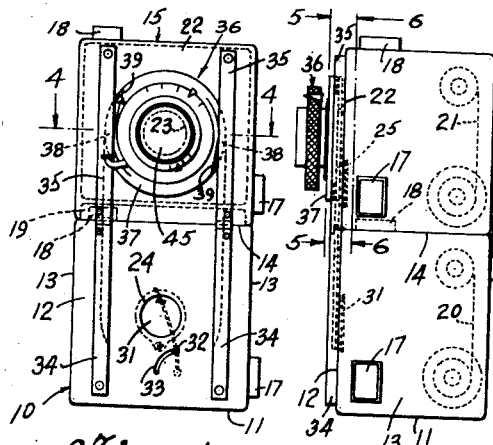
Fig. 1.
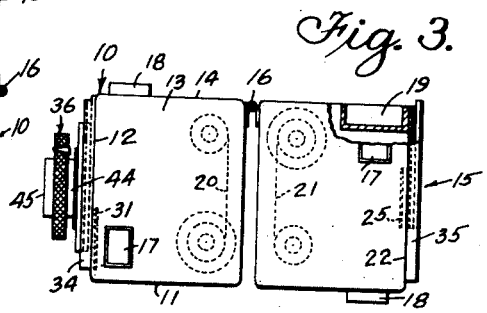
Fig. 2.
Fig. 3.
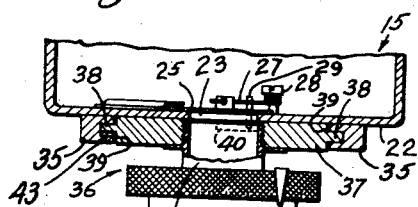
Fig. 4.
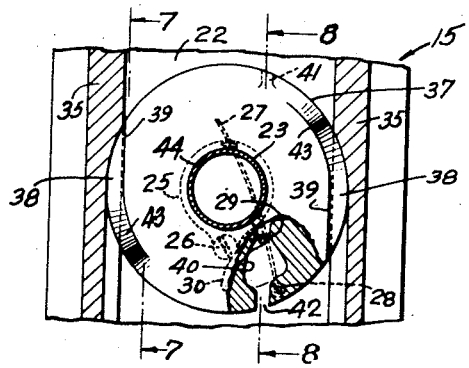
Fig. 5.
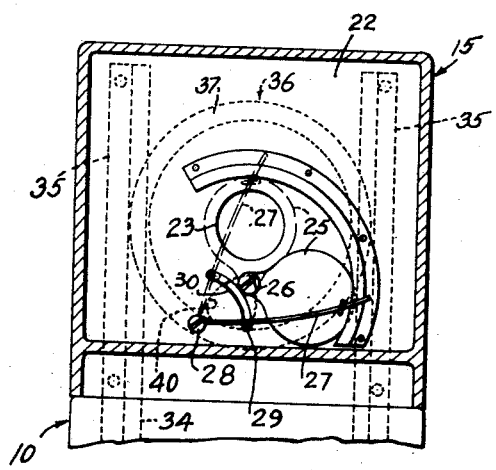
Fig. 6.
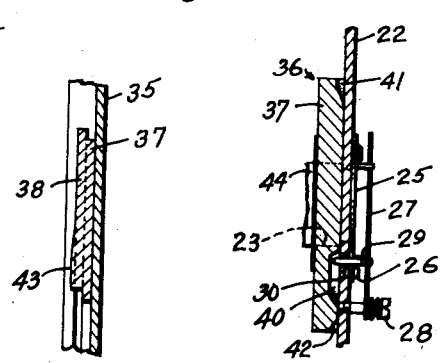
Fig. 7.     Fig. 8.
INVENTOR.
Frederick L. O. Roehrig.
BY
Wilfred L. Lawson
ATTORNEY.

United States Patent Office 2,696,152
Patented Dec. 7, 1954

2,696,152

PLURAL FILM CAMERA WITH SLIDING LENS UNIT

Frederick L. O. Roehrig, Yucaipa, Calif.

Application March 7, 1951, Serial No. 214,369

2 Claims. (Cl. 95—11)

This invention relates to photography and more especially to a single lens dual camera.

An object of the invention is to provide novel improvements in a camera having two film compartments and a single lens system adapted to function with both of the film compartments.

Another object of the invention is to provide a novel single lens dual camera having means for shifting the lens system from one compartment to the other and having actuating means for the compartment shutters actuatable when the lens mount is shifted.

Another object of the invention is to provide improvements in a single lens dual camera having a pair of film compartments adapted to be separated for independent operation.

Other objects and advantages will appear and be brought out more fully in the following specification, reference being had to the accompanying drawing.

In the drawing:

Figure 1 is a front elevation view of a single lens dual camera embodying the invention.

Figure 2 is a side elevation view of the same.

Figure 3 is a side elevation view of the same with one of the film compartments moved to an inoperative position.

Figure 4 is an enlarged sectional view taken along the line 4—4 of Figure 1.

Figure 5 is an enlarged sectional view taken along the line 5—5 of Figure 2.

Figure 6 is an enlarged sectional view taken along the line 6—6 of Figure 2.

Figure 7 is a sectional view taken along the line 7—7 of Figure 5.

Figure 8 is a sectional view taken along the line 8—8 of Figure 5.

In the drawing the numeral 10 designates a camera film compartment or box having a generally rectangular wall formation, including a bottom 11, a front wall 12, side wall 13, and a top wall 14. A generally similar film compartment or box 15 is connected by a hinge 16 to film compartment 10 and is adapted to be supported on film compartment 10 as shown in Figures 1 and 2 or to be swung to the position shown in Figure 3 when it is desired to use film compartment 10 separately. The film compartments may be provided with side viewers 17 and top viewers 18, as shown compartment 15 being formed with a recess 19 to admit the top viewer 18 of film compartment 10. Film compartments 10 and 15 are formed with suitable means for loading films 20 and 21, respectively, of any conventional type.

Film compartment 15 has a front wall 22 which is formed with a light opening or aperture 23 and wall 12 is formed with a similar aperture 24. A shutter 25 for aperture 23 is pivotally mounted on a screw 26 and an actuator is provided therefor and comprises spring wire 27 having one end secured to a screw 28 and has an actuating pin 29 which extends through an arcuate slot 30 in front wall 22. A similar shutter 31 is provided for opening 24 and has an actuating pin 32 which extends through a slot 33 in front wall 12.

A pair of cooperating guide channel members 34 is secured on front wall 12 with the aperture 23 therebetween and a similar pair of cooperating guide channel members 35 is secured on front wall 22 with the aperture 24 therebetween and alined with channel members 34.

A lens mount 36 comprises a circular plate 37 having marginal flanges 38 which interfit in the grooves of channel members 34 and 35 such flanges being bordered by parallel shoulders 39, adapted to engage the edges of channel members 34 and 35. Plate 37 is formed with a somewhat triangular shaped recess 40, the edges of which are adapted to engage pins 29 and 32 of shutters 25 and 27. Plate 37 has cam surfaces 41 and 42 which move across the ends of pins 29 and 32 when plate 37 is raised or lowered. The flanges 38 are provided with cam portions 43 which engage and make frictional contact in tthe grooves of channel members 34 and 35 for holding the lens mount in position after being shifted. The lens tube 44, having a lens 45, is suitably secured to plate 37.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a dual camera, a pair of rectangular film boxes having their front walls each provided with a light aperture, hinge connections between adjacent edges of the back walls of said boxes so that the boxes can be swung into either superimposed or back to back relation, a shutter associated with each light aperture, vertical parallel guide elements disposed at opposite sides of the light aperture in each front wall, said guide elements being disposed in aligned relation when said boxes are in superimposed relation, a lens system, means for mounting said lens system for sliding and turning movements in said guide elements for selective alignment with said light apertures, means for actuating either of said shutters comprising a lever projecting through a slot in the front wall of each box, means for facilitating partial turning of the lens mounting relative to said guide elements when the lens system is aligned with either aperture and means for coupling the mounting with the adjacent shutter lever to actuate the lever upon turning of the mounting.

2. In a dual camera, a pair of rectangular film boxes having their front walls each provided with a light aperture, hinge connections between adjacent edges of the back walls of said boxes so that the boxes can be swung into either superimposed or back to back relation, a shutter associated with each light aperture, vertical parallel guide elements disposed at opposite sides of the light aperture in each front wall, said guide elements being disposed in aligned relation when said boxes are positioned in superimposed relation, a lens system, means for mounting said lens system for sliding and turning movements in said guide elements for selective alignment with said light apertures, said guide elements being slotted along their opposite side edges, said lens mounting comprising a flat circular body disposed between the guides and having outwardly directed arcuate edge flanges slidably engaged in said slots, said arcuate flanges facilitating the partial turning of said mounting relative to said guide elements, an actuating lever for each shutter projecting through a slot in the adjacent apertured wall and means for coupling the mounting with the adjacent lever to actuate said last named lever upon turning of the mounting.

References Cited in the file of this patent

UNITED STATES PATENTS

| Number | Name | Date |
|---|---|---|
| 2,245,606 | Rauch | June 17, 1941 |

FOREIGN PATENTS

| Number | Country | Date |
|---|---|---|
| 202,046 | Great Britain | Aug. 13, 1923 |
| 51,731 | Denmark | June 8, 1936 |